United States Patent [19]

Honeycutt, Jr. et al.

[11] 4,171,093
[45] Oct. 16, 1979

[54] DURABILITY FLAP AND SEAL LINER ASSEMBLY FOR EXHAUST NOZZLES

[75] Inventors: Fred L. Honeycutt, Jr., Lake Park; Donald R. Senterfitt, Jupiter, both of Fla.

[73] Assignee: The United States of America as represented by the Secretary of the Air Force, Washington, D.C.

[21] Appl. No.: 826,226

[22] Filed: Aug. 19, 1977

[51] Int. Cl.² .............................................. B64C 15/06
[52] U.S. Cl. .............................. 239/127.3; 239/265.39
[58] Field of Search ............ 239/127.1, 127.3, 265.39, 239/265.41

[56] References Cited

U.S. PATENT DOCUMENTS

| | | | |
|---|---|---|---|
| 2,794,317 | 6/1957 | Brown | 239/265.39 |
| 2,989,845 | 6/1961 | Howald | 239/265.41 |
| 3,044,258 | 7/1962 | Carlton et al. | 239/265.39 X |
| 3,214,905 | 11/1965 | Beavers et al. | 239/265.39 X |
| 3,972,475 | 8/1976 | Nelson et al. | 239/127.3 |
| 3,979,065 | 9/1976 | Madden | 239/127.3 |
| 4,081,137 | 3/1978 | Sutton et al. | 239/265.39 |

Primary Examiner—John J. Love
Attorney, Agent, or Firm—Joseph E. Rusz; Jacob N. Erlich

[57] ABSTRACT

A flap and seal assembly for an exhaust nozzle having a flap liner and seal liner which are in slidable engagement with one another. The seal liner has a facesheet, grid sheet and corrugated supporting sheet while the flap liner has a facesheet and an inner support sheet. The specific inter-relationship between the various elements of the flap and seal liner provides improved support, hot gas aspiration as well as vibratory damping which thereby allows for the use of thinner materials in the construction of the liner assembly.

12 Claims, 6 Drawing Figures

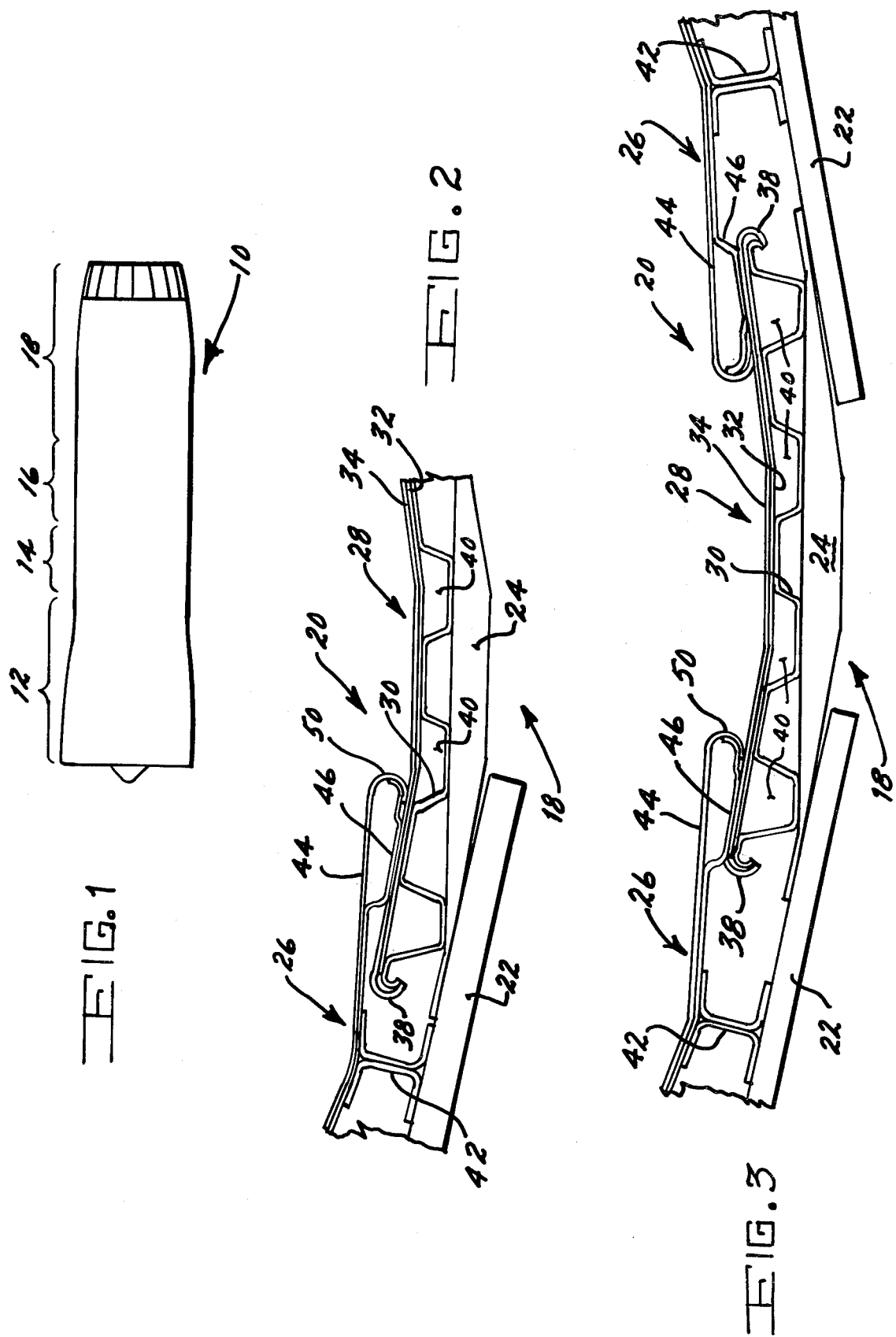

DURABILITY FLAP AND SEAL LINER ASSEMBLY FOR EXHAUST NOZZLES

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a variable geometry nozzle to be used on an augmented turbofan engine, and, more particularly to a liner assembly which effectively protects the flaps and seals of the nozzle from the large thermal gradients established between the hot inner surface of the nozzle and cooled supporting member.

With the increasing interest in power plants for high Mach supersonic flight, e.g., turbo-ramjets, pure ramjets and rockets, it has become increasingly important to provide means for optimizing engine operating efficiency under dissimilar flight conditions. For example, it is known that for subsonic operation an efficient type of jet exhaust nozzle is a nozzle having a convergent shape. However, as near sonic and at supersonic speeds it is more desirable to employ a nozzle having a convergent portion followed by a divergent portion. For most efficient operation it is also desirable to provide means to vary both the minimum flow area, or throat, of the convergent portion of the nozzle and the nozzle exit area at the downstream end of the divergent portion.

In order to fulfill the requirements set forth hereinabove it has become accepted practice to provide what is commonly known as the "variable area convergent-divergent nozzle." Examples of such a nozzle may be found in U.S. Pat. Nos. 3,044,258 and 3,214,905.

It is also desirable, due to the high temperatures associated with the use of the nozzle set forth hereinabove to provide some means for cooling the interior of the nozzle. Since, as discussed hereinabove, such a nozzle should be infinitely adjustable over a wide range of operating conditions, the means for cooling, i.e., providing secondary air flow, should be controlled or scheduled so that a continuous and, at all times, sufficient air flow is provided. U.S. Pat. Nos. 3,972,475 and 3,979,065 provide illustrations of variable area convergent-divergent nozzles which incorporate therein acceptable cooling means.

Unfortunately, however, the advent of cooled variable area convergent-divergent nozzles has also produced particular problems with respect to the individual parts which make up the nozzle. Nozzles heretofore in use had problems with respect to durability of parts, in that, sections of the nozzle quite readily distorted, cracked and even burned away in a period of time much shorter than called for by the design parameters.

This durability problem has been especially troublesome in designs where large thermal gradients were induced in the flap and seal liners. These gradients were due to simultaneous exposure of the flap and seal liners to the hot exhaust gases and the cooling air. The problem was further aggravated by (1) part configuration, (2) cooling air leakage, (3) vibration, and (4) hot gas inflow. As a result thereof, thermal stresses quickly distorted the parts. In a short time, for example, cracks occurred which produced leakage of the hot gas, which in turn quickly burned away the heat sensitive underlying parts, thereby destroying the nozzle. Furthermore, in many instances, cooling air in the convergent-divergent nozzle could not be properly controlled to protect the divergent portion thereof. As a consequence, that portion of the nozzle was burned away, thereby destroying the nozzle.

In general, the flaps of an exhaust nozzle are made of Titanium (Ti). Titanium in an excellent lightweight structural metal, until, unfortunately it gets hot. Means must, therefore, be provided to protect the Titanium flaps from the hot exhaust gases.

Prior art thermal protection of Titanium flaps is accomplished using Colombium (Cb) liners. Unfortunately, Colombium is heavy, very costly and of sufficient rarity so as to possibly not be readily available in the future. It is therefore essential to replace completely any and all need for the element Colombium in engine exhaust nozzles. Furthermore, in so doing it is also readily apparent that the relative cool air flowing over and near the Ti flaps must be separated from the wiltingly hot exhaust gases from the combustion section of the engine, thereby protecting the flaps.

SUMMARY OF THE INVENTION

The instant invention overcomes the problems set forth hereinabove by providing a liner assembly capable of effectively protecting the flaps and seals of an exhaust nozzle, and particularly a variable area convergent-divergent nozzle.

The flap and seal liner assembly of this invention is mounted circumferentially within the interior periphery of an exhaust nozzle and is made of lightweight, structurally sound material constructed in the form of a plurality of flap and seal liners which are in slidable engagement with one another. As a result thereof, the present invention more effectively separates the hot and cool airflow of an exhaust nozzle right up to the throat. The cool air then flows along the divergent portion of the nozzle and effectively provides protection of the nozzle parts to the engine exit.

The seal liner of the liner assembly of the instant invention is constructed of a thin, thermally-free Haynes 188 facesheet supported by an Inconel 718 grid sheet. There is no mid-section hump and the outer edges of the facesheet are segmented or slotted to prevent facesheet buckling due to the severe thermal gradients inherent in cooled convergent-divergent nozzles. The edge slots are positioned over the grid sheet to minimize hot gas aspiration into the coolant. The grid sheet has a plurality of openings therein and not only provides support and reduces hot gas aspiration, but also provides vibratory damping which allows a thinner facesheet to be used with the instant invention. The grid sheet is spot welded to a supporting sheet which is corrugated in the lengthwise or longitudinal direction and rests upon the convergent seals of the nozzle.

The flap liner of the liner assembly of this invention is also formed from a thin, thermally free Haynes 188 facesheet, supported by an Inconel 718 grid sheet or inner support sheet. Since the facesheet of the flap liner is virtually entirely in contact with the hot exhaust gases and is not subjected to the severe temperature gradients, it is not slotted. The inner support sheet, however, has a plurality of holes therein which serve the same purpose as the openings in the grid sheet of the seal liner, that is, of weight reduction, structural support and cooling control.

It is therefore an object of this invention to provide a flap and seal liner assembly which effectively permits efficient cooling and temperature control of the nozzle parts of an exhaust nozzle.

It is another object of this invention to provide a flap and seal liner assembly for an exhaust nozzle which substantially reduces the thermal stress of the nozzle parts, thereby increasing their lifespan.

It is still another object of this invention to provide a flap and seal liner assembly for an exhaust nozzle in which substantial weight reduction is realized.

It is a further object of this invention to provide a flap and seal liner assembly for an exhaust nozzle which allows the use of less exotic materials in the construction thereof.

It is still a further object of this invention to provide a flap and seal liner assembly for an exhaust nozzle which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 1 is a pictorial representation of the location of an exhaust nozzle on a turbojet engine;

FIG. 2 is a front view of a portion of the flap and seal liner assembly of this invention in position within an exhaust nozzle of the type shown in FIG. 1;

FIG. 3 is a front view of the flap and seal liner assembly of this invention shown in FIG. 2 with the nozzle having its diameter in a more enlarged position;

DETAILED DESCRIPTION OF THE PREFERRED EMBODIMENT

Figure 4:
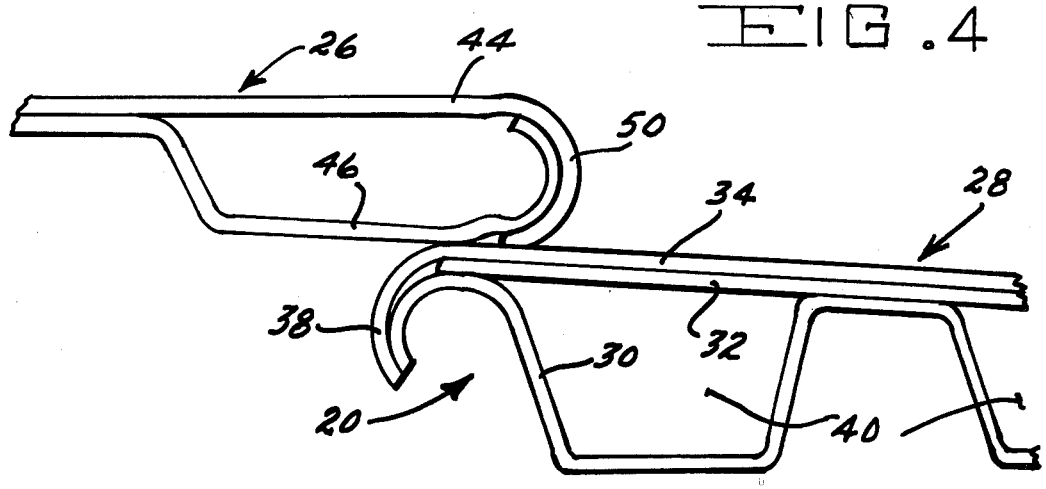
FIG. 4 is an exaggerated segment of the flap and seal liner assembly of this invention.

Reference is now made to FIG. 1 of the drawing which pictorially represents a conventional turbojet engine 10 which includes a conventional compressor section 12, burner section 14, turbine section 16 and exhaust duct and nozzle section 18. For purposes of best illustrating the instant invention, exhaust duct and nozzle section 18 takes the form of any conventional cooled, variable area, convergent-divergent nozzle such as more fully described in U.S. Pat. No. 3,972,475.

The flap and seal liner assembly 20 of this invention is clearly illustrated in remaining FIGS. 2–6, with particular emphasis placed on FIGS. 2 and 3 of the drawing. Since nozzle 18 is of a variable diameter as well as being convergent-divergent in construction, for clarity, only two positions of flap and seal liner assembly 20 of this invention will be shown in the drawing (FIGS. 2 and 3).

As specifically set forth in U.S. Pat. No. 3,972,475, nozzle 18 is made up of a plurality of flaps 22 and seals 24. Therefore, for clarity and ease of understanding of this invention, only a portion of flap and seal liner assembly 20 of this invention is illustrated in conjunction with a pair of flaps 22 and a seal 24. However, it is readily apparent that, in actuality, a liner assembly 20 circumferentially surrounds the inner periphery of a plurality of flaps and seals 22 and 24, respectively.

Referring now to FIGS. 2–4 of the drawing, seal and flap liner assembly 20 (which protects the convergent Ti flaps 22 and seals 24 from extreme heat) is made of a plurality of slidably engageable flap and seal liners 26 and 28, respectively.

Figure 5:
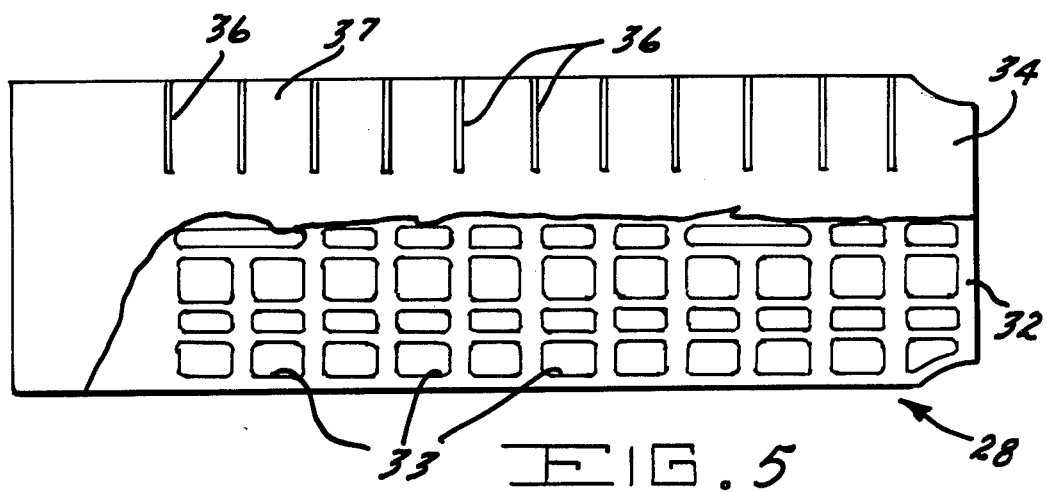
FIG. 5 is a partially fragmented plan view of the facesheet and grid sheet of the seal liner of the flap and seal liner assembly of this invention.

Seal liner 28 is made up, in composite design, of a lengthwise (longitudinal direction within exhaust nozzle 18) corrugated supporting sheet 30 which either rests upon or is fixedly secured by any conventional securing mean—such as rivets to convergent seal 24. A back up grid sheet 32 having a plurality of openings 33 therein (shown in FIG. 5) is secured by any conventional securing means such as welding to corrugated support sheet 30. Situated on top of grid sheet 32 is a slotted, thermally-free facesheet 34, which rests atop the grid sheet 32 in such a manner that the solid portion of grid sheet 32 seals the openings of slots 36 in facesheet 34 as best illustrated in FIG. 5 of the drawing. Facesheet 34 is retained in place along the direction parallel to the longitudinal axis of engine 10 by a single rivet (not shown) and held in the transverse direction by two curled edges 38, one on each (long) side.

Grid sheet 32 functions to provide support for the facesheet 34 in a direction that is both transverse to the corrugated supporting sheet 30 and radial to the centerline of engine 10. The transverse structural members of the grid sheet 32 prevent facesheet 34 from collapsing "down" and into space 40 of the corrugated supporting facesheet 30. This allows facesheet 34 to be extremely thin, thereby saving engine weight. In addition, grid sheet 32 also damps (through the mere fact that it makes physical contact) the many different vibration modes which would be set up in the facesheet 34 by its exposure to the exhaust gases. As a result thereof grid sheet 32 performs its many functions in a synergistic manner.

As shown in FIGS. 2 and 3, facesheet 34 is partially covered at times by the flap liner 26, hence during those times, the middle part of facesheet 34 will be extremely hot while the outer parts would be relatively cool. To prevent buckling of facesheet 34 during these times, slots 36 are cut out of the edges 37 (see FIG. 5). These slots 36 allow the material of facesheet 34 to expand and contract with the changes in temperature while minimizing any internal stresses which occur.

During engine operation, facesheet 34 lays in place and only carries a small ΔP load. Thus, due to the structural support, vibration damping and sealing given by grid sheet 32, facesheet 34 can be made of very thin material. This material is generally Haynes 188 metal while the grid sheet is constructed of Iconel 718. In addition, since extremely thin sheets of material are required with the instant invention it is possible to use thin pieces of Colombium at a great weight savings while maintaining the other desirable properties and still maintain economical engine design.

Furthermore, corrugated supporting sheet 30 may be cut with holes that match the holes cut into the grid 32. These holes not only lighten the entire structure, but also allow cooling air to contact the undersurface of the facesheet 34, and hence control its temperature, keeping it within its useful temperature range. Grid sheet 32, being spot welded in certain places to the corrugated sheet 30 also physically separates the hot facesheet 34 from the relatively cool corrugated sheet 30. There is, then, only localized heating of the supporting structure with this invention. It is, therefore, better able to withstand the forces acting upon it. And, it is quite apparent, greatly increases durability and lifespan than prior art devices.

Each seal liner 28 was designed as a unit with every element thereof having a specific function which interconnects it with the others so that they all work together, in concert, to accomplish the objectives of this invention.

Reference is once again made to FIGS. 2-4 for the detailed description of flap liner 26. Flap liner 26 is fixedly secured by any suitable support 42 to flap 22 and is in slidable engagement with facesheet 34 of seal liner 28. Making up flap liner 26 is a thermally free facesheet 44 preferably of Haynes 188 metal and an inner support 46 preferably of Inconel 718 metal.

Flap liner facesheet 44 is thermally-free to prevent buckling, and, since it is entirely (for all practical purposes) in contact with the hot exhaust gases, is not slotted, there being no severe temperature gradients with respect thereto. Uniformly supporting thin facesheet 44 is inner support 46.

Figure 6:
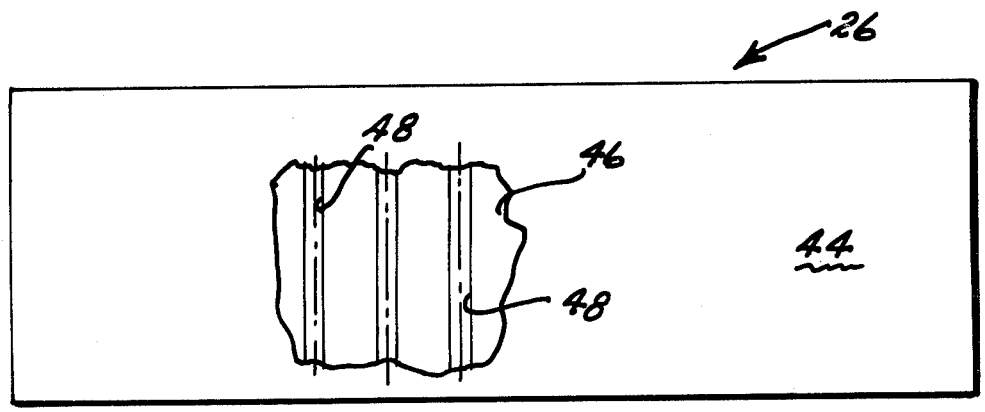
FIG. 6 is a partially fragmented plan view of the facesheet and inner support sheet of the flap liner of the flap and seal liner assembly of this invention.

As best shown in FIG. 6, inner support 46 has a plurality of cooling holes 48 formed therein in order to control the underside temperature of facesheet 44. Furthermore, support 46 extends around the inside of facesheet 44 where the outer edge curls therearound thereby preventing the edges of facesheet 44 from becoming too cool and buckling under the resultant temperature gradients. In addition, such an arrangement provides a seal for the curled end 50 of facesheet 44. In case the curled end 50 should buckle upwards, inner support 46 then seals the cooling air within the cooling cavity where it belongs.

Therefore, support 46 exhibits synergy similar to that of the seal liner grid sheet 32. Support 46 functions as a structural support, provides vibration damping, and further provides temperature control for facesheet 44. Additionally, it gives thermal isolation of the curled end 50 of facesheet 44, provides second level (redundant) sealing of the curled edge 50 should facesheet 44 distort and it reduces the center-to-edge thermal gradients in facesheet 44.

Holes 48 within support 46 perform the same multiple functions of weight reduction, structural support, and cooling control as do those of the seal liner grid sheet 32 of seal liner 28. It further thermally isolates that part of seal liner facesheet 34 upon which it rests and reduces the seal liner facesheet 34 thermal gradient from center-to-edge by as much as 600° F. relative to existing designs.

During engine operation, cooling air or the like passes on the backside of liner assembly 20 between liner assembly 20 and flaps 22 and seals 24 as the hot engine gases pass over facesheets 44 and 34 of liner assembly 20. As the nozzle 18 varies in area the flap liner 26 and seal liner 28 maintain contact during sliding relationship with respect to each other. Therefore, at any time during operation liner assembly 20 not only protects the Titanium flaps 22 and seals 24 from the extreme heat of the exhaust gases but also separates the coolant air from the exhaust gases. Since the flap and seal liner assembly 20 effectively separates the hot and cool air flows right up to the throat, the cool air can therefore flow along the divergent portion of nozzle 18. As a result, nozzle parts see less thermal stress, have longer useful lives and perform their intended operation more efficiently than in the past.

Although this invention has been described with reference to a particular embodiment, it will be understood to those skilled in the art that this invention is also capable of further and other embodiments within the spirit and scope of the appended claims.

We claim:

1. In an exhaust nozzle having a plurality of flaps and seals circumferentially spaced along the inner periphery of said nozzle, the improvement therein being in the form of a flap and seal liner assembly operably connected to said plurality of flaps and seals, said flap and seal liner assembly comprising at least one seal liner and at least one flap liner in slidable engagement with one another, said seal liner having a corrugated support sheet operably connected to one of said plurality of seals, a grid sheet operably connected to said support sheet and a facesheet operably connected to said grid sheet, said flap liner having a support sheet operably connected to one of said plurality of flaps and in slidable engagement with said facesheet of said seal liner and a facesheet operably connected to said support sheet of said flap liner whereby said flap and seal liner assembly effectively separates the flow of gas over said facesheets from the flow of gas over said flaps and seals.

2. In an exhaust nozzle as defined in claim 1 wherein said facesheet of said seal liner has a plurality of slots formed in an edge therein.

3. In an exhaust nozzle as defined in claim 2 wherein said grid sheet of said seal liner has a plurality of openings therein.

4. In an exhaust nozzle as defined in claim 1 wherein said support sheet of said flap liner has a plurality of openings therein.

5. In an exhaust nozzle as defined in claim 3 wherein said support sheet of said flap liner has a plurality of openings therein.

6. In an exhaust nozzle as defined in claim 1 wherein said support sheet and said facesheet of said seal liner have curled edges in a direction transverse to the longitudinal axis of said exhaust nozzle, said curled edges engaging each other and thereby preventing movement of said facesheet of said seal liner with respect to said support sheet of said seal liner in said transverse direction.

7. In an exhaust nozzle as defined in claim 1 wherein said facesheet and said support sheet of said flap liner have curled edges in a direction transverse to the longitudinal axis of said exhaust engine, said curled edge of said facesheet of said flap liner curling around said curled edge of said support sheet of said flap liner thereby preventing movement of said facesheet of said flap liner with respect to said support sheet of said flap liner in said transverse direction.

8. In an exhaust nozzle as defined in claim 7 wherein said curled edge of said support sheet of said flap liner extends around the inside of said facesheet of said flap liner.

9. In an exhaust nozzle as defined in claim 7 wherein said support sheet and said facesheet of said seal liner have curled edges in a direction transverse to the longitudinal axis of said exhaust nozzle, said curled edges engaging each other and thereby preventing movement of said facesheet of said seal liner with respect to said support sheet of said seal liner in said transverse direction.

10. In an exhaust nozzle as defined in claim 9 wherein said facesheet of said seal liner has a plurality of slots formed in an edge therein.

11. In an exhaust nozzle as defined in claim 10 wherein said grid sheet of said seal liner has a plurality of openings therein.

12. In an exhaust nozzle as defined in claim 11 wherein said support sheet of said flap liner has a plurality of openings therein.

* * * * *